(12) United States Patent
Zhou et al.

(10) Patent No.: US 11,313,783 B2
(45) Date of Patent: Apr. 26, 2022

(54) NANOMETER CUTTING DEPTH HIGH-SPEED SINGLE-POINT SCRATCH TEST DEVICE AND TEST METHOD THEREOF

(71) Applicant: DALIAN UNIVERSITY OF TECHNOLOGY, Liaoning (CN)

(72) Inventors: Ping Zhou, Liaoning (CN); Ning Huang, Liaoning (CN); Renke Kang, Liaoning (CN); Dongming Guo, Liaoning (CN); Ying Yan, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 429 days.

(21) Appl. No.: 16/346,760

(22) PCT Filed: Nov. 8, 2017

(86) PCT No.: PCT/CN2017/109913
§ 371 (c)(1),
(2) Date: May 1, 2019

(87) PCT Pub. No.: WO2019/037282
PCT Pub. Date: Feb. 28, 2019

(65) Prior Publication Data
US 2020/0056977 A1 Feb. 20, 2020

(30) Foreign Application Priority Data
Aug. 21, 2017 (CN) .......................... 201710718588.8

(51) Int. Cl.
*G01N 15/10* (2006.01)

(52) U.S. Cl.
CPC .............................. *G01N 15/1056* (2013.01)

(58) Field of Classification Search
CPC ..... G01N 3/46; G01N 3/58; G01N 2203/0053
See application file for complete search history.

(56) References Cited

U.S. PATENT DOCUMENTS

2009/0145208 A1   6/2009   Coudert et al.
2016/0370272 A1*  12/2016  Bellemare ................ G01N 3/60

FOREIGN PATENT DOCUMENTS

CN     1254154 A    5/2000
CN   102107391 A    6/2011
(Continued)

OTHER PUBLICATIONS

Lee, Seoung Hwan "Analysis of ductile mode and brittle transition of AFM nanomachining of silicon" International Journal of Machine Tools & Manufacture 61, 2012, 71-79.
(Continued)

*Primary Examiner* — Herbert K Roberts
*Assistant Examiner* — Fatemeh Esfandiari Nia
(74) *Attorney, Agent, or Firm* — Novick, Kim & Lee, PLLC; Allen Xue (57) ABSTRACT

A nanometer cutting depth high-speed single-point scratch test device includes a workbench, an air-bearing turntable, a test piece fixture, a test piece, a Z-direction feeding device, a nano positioning stage, a force sensor and a scratch tool. A micro convex structure with controllable length and height is machined in a position of the test piece to be scratched.

10 Claims, 4 Drawing Sheets

(56) References Cited

FOREIGN PATENT DOCUMENTS

| CN | 102564336 A | 7/2012 | | |
|---|---|---|---|---|
| CN | 103878392 A | 6/2014 | | |
| CN | 104070422 A | 10/2014 | | |
| CN | 104907417 A | 9/2015 | | |
| CN | 105021478 A | 11/2015 | | |
| CN | 105628611 A | 6/2016 | | |
| CN | 105717002 A | 6/2016 | | |
| CN | 105717030 A | 6/2016 | | |
| DE | 102009049155 A1 | * | 4/2011 | ............. B21D 28/16 |
| JP | 01-138437 A | | 5/1989 | |
| WO | WO-2017100665 A1 | * | 6/2017 | ............... G01N 3/44 |

OTHER PUBLICATIONS

O'Connor, Brian P. et al. "On the effect of crystallographic orientation on ductile material removal in silicon" Precision Engineering 29, 2005, 124-132.

* cited by examiner

NANOMETER CUTTING DEPTH HIGH-SPEED SINGLE-POINT SCRATCH TEST DEVICE AND TEST METHOD THEREOF

TECHNICAL FIELD

The present disclosure belongs to the field of material testing and ultra-precision machining in mechanical machining, and particularly relates to a nanometer cutting depth high-speed single-point scratch test device and a test method thereof.

BACKGROUND ART

Ultra-precision grinding machining can efficiently remove material with nanometer-magnitude cutting depth to obtain higher shape precision and surface quality, and is one of the most important technologies in precision part machining. The essence of machining mechanism is that a large number of abrasive particles with different shapes on a surface of an abrasive tool participate in cutting with nanometer-magnitude cutting depth together, so as to realize the machining process. Therefore, in the research of ultra-precision grinding mechanism, people often design nanometer cutting depth single-point scratch test as an important method to understand the ultra-precision grinding process. Throughout the literature at home and abroad, the single-point scratch tests of different materials have been extensively and deeply researched, but the existing test equipment and test scheme still have some shortcomings.

The most common nanometer cutting depth single-point scratch test is generally conducted on the basis of Atomic Force Microscope (AFM) or on precision instruments such as NanoIndenter. In the article entitled "Analysis of ductile mode and brittle transition of AFM nanometer machining of silicon" (Lee, S. H., Int. J. Mach. Tools Manuf., 2012, 61, 71-79), by using an AFM device, the author realizes the nanometer scratch tests of different scratch depths, and further observes and analyzes the transformation between elastic-plastic deformation mechanism and brittle-plastic deformation mechanism of the scratch test piece in the test process with the aid of a field emission scanning electron microscope. However, the scratch speed adopted in this test is on µm/s magnitude (5 µm/s), which is far lower than the grinding speed on m/s magnitude of abrasive particles in the actual grinding process.

In order to realize the high-speed single-point scratch test and restore the real machining state as much as possible, some scholars adopt a pendulum scratch method, in the article entitled "On the effect of crystallographic orientation on ductile material removal in silicon" (Brian P. O'Connor, Int. J. Precis. Eng., 2005. 29(1): p. 124-132.), the author O'Connor realizes high-speed single-point scratch with the cutting depth from shallow to deep and then to shallow through the high-speed rotary motion of the scratch tool. According to the literature, the critical cutting depth corresponding to chip formation or brittle-plastic transformation is usually within 50 nm in the scratch process of hard brittle material (Lee, S. H., Analysis of ductile mode and brittle transition of AFM nanomachining of silicon. International Journal of Machine Tools and Manufacture, 2012. 61: p. 71-79.), limited by a rotation radius of the scratch tool used in the pendulum scratch method, lengths of residual imprint with cutting depths within one hundred nanometer magnitude are short, and limited by a sampling frequency of a dynamometer (assuming a maximum scratch depth is 1 µm and a pendulum radius is 150 mm, a residual imprint with a length of 1095 µm is generated, the length of plastic-deformed residual imprint with the cutting depth of less than 100 nm is about 28 µm, and under the condition that the scratch speed is 1 m/s, if a datum is collected for the change of every 10 nm in the cutting depth, the sampling frequency needs to reach 357 kHz), cutting force and scratch force signals under different nanometer cutting depth conditions cannot be collected by the pendulum scratch method under a high-speed (m/s magnitude) scratch condition.

Chinese patent CN201610077965.X discloses 'Single-abrasive-grain High-speed Continuous Scratching Testing Machine and Application Thereof', based on a ball-on-disc scratch method, the inventor uses an electric spindle to drive a test piece to rotate at a high speed to generate a high line speed required for high-speed scratch; and by combining a linear motion and a circular motion of a single-point tool, high-speed single-point scratch with the speed similar to actual grinding speed is also realized. However, the scratch method provided by the patent has two main problems: first, the scratch depth cannot be accurately controlled in a nanometer magnitude in the high-speed scratch process, a scratch profile measurement result in a test example shows that: a depth of the remaining residual imprint is about 20 µm, and a stable cutting depth that can be realized by the scratch tool is in a micrometer magnitude, even if a positioning precision of a Z axis setter in the patent is better than 100 nm, the control over the nanometer-magnitude cutting depth cannot be guaranteed under the high-speed scratch condition by comprehensively considering end face runout in a rotation process of a motorized spindle and a surface profile of the workpiece to be scratched; and on the other hand, the scratch testing machine can certainly realize high-speed scratch with gradually changed cutting depth by using the end face runout and the undulation of the surface profile of the workpiece, but for the micron/submicron curvature radius of the single-point tool, it is very likely to encounter larger undulation of the workpiece or the end face runout in the scratch process, the cutting depths of the abrasive particles increase sharply, thus causing the scratch tool to collapse, and the long-term continuous contact also easily leads to the abrasion of the single-point tool. Therefore, the test method provided by this patent cannot research the characteristics such as the cutting generation point and the brittle-plastic transformation point of the abrasive particles with micron/submicron curvature radius scratching hard brittle material under the high-speed scratch condition.

In the field of ultra-precision grinding machining, nanometer cutting depth high-speed single-point scratch test is an important means to reveal an ultra-precision grinding mechanism. In order to realize this test method, both the process method and the test equipment shall be further researched and improved. Firstly, it is need to ensure that the scratch length can be controlled, that is, the scratch length is shortened as far as possible under the premise that sufficient datas can be obtained at different cutting depths, so as to reduce the difficulty of finding and observing the residual imprint by a microscope at the later stage; in addition, in order to reveal the machining mechanism of cutting the abrasive particles with the nanometer-magnitude cutting depth in the ultra-precision grinding process, a maximum scratch depth shall be approximately controlled within one hundred nanometer magnitude, and realize the high-speed scratch test process with the cutting depth from shallow to deep and then to shallow on the residual imprint with limited length; and finally, it is need to ensure that a large number of force signal data points can correspond one-to-one with the profile position of the remaining residual imprint. Chinese patent CN201410324503.4 discloses 'Nanometer-depth High-speed Scratch Method of Single-particle Diamond Needle Tip with Submicron Curvature Radius', which uses a combined deviation of flatness of a silicon wafer and end face runout of a grinding machine to complete the nanometer-depth high-speed scratch test of single-particle diamond needle tip with submicron curvature radius. This patent provides a method to realize high-speed scratch as a whole, but cannot obtain force signals in the scratch process, and the residual imprint position is random and difficult to be observed and located.

To sum up, in order to further reveal the ultra-precision grinding mechanism, the current single-point scratch test method has the following three problems:

1) Single-point scratch test based on AFM or precision instruments such as NanoIndenter is limited by the principle of linear scratch motion, and the scratch speed on m/s magnitude of abrasive particles in the actual grinding process cannot be realized.

2) The pendulum scratch method is limited by the rotation radius of the scratch tool and the sampling frequency of the dynamometer, and scratch force signals under different nanometer cutting depth conditions cannot be accurately collected under the high-speed scratch condition.

3) The ball-on-disc scratch method is limited by the feed speed of the scratch tool, and the scratch length cannot be effectively controlled under the high-speed scratch condition, so that it is very difficult to find the feature point of the remaining profile of residual imprint by a microscope.

SUMMARY OF THE DISCLOSURE

In order to solve the above problems existing in the prior art, the present disclosure is to design a nanometer cutting depth high-speed single-point scratch test device and a test method thereof, which can achieve the following purposes:

1) The nanometer cutting depth high-speed single-point scratch test of a micron/submicron curvature radius can effectively restore a true ultra-precision grinding state, with the specific purpose that: the curvature radius magnitude of a single-point scratch tool is reduced from mm magnitude to the micron/submicron magnitude, and the effective edge radius of an abrasive particle in the ultra-precision grinding process can be restored; the cutting depth is controlled in a nanometer magnitude, the effective cutting depth of the abrasive particle in the ultra-precision grinding process can be restored, and the integrity of the scratch tool in high-speed scratch is ensured; and the scratch speed is increased from μm/s to m/s, and the actual machining speed of the abrasive particle in the ultra-precision grinding process can be restored.

2) Scratch force signals under different nanometer cutting depth conditions are accurately collected under the high-speed scratch condition, and the scratch force-scratch depth correlation is explicit.

3) The scratch length can be controlled, on the basis of ensuring that the scratch force-scratch depth correlation is explicit and a feature point of a remaining profile of scratch can be clearly identified, the scratch length is shortened, the remaining profile of scratch is convenient to be observed by the microscope after the scratch test, the characteristics of an elastic-plastic transformation point and a brittle-plastic transformation point can be distinguished, and at the same time, the processing time of the single-point tool is reduced, and the tool abrasion is controlled.

In order to realize the purposes above, the following technical solution is used in the present disclosure.

A nanometer cutting depth high-speed single-point scratch test device comprises:

a base;

a horizontally arranged workbench fixedly installed on a top surface of the base;

a vertically arranged air-bearing turntable fixedly installed on the workbench;

a test piece fixture that is installed on an end face of a top portion of the air-bearing turntable and is coaxial with the air-bearing turntable, the air-bearing turntable drives the test piece fixture to rotate, and the test piece fixture is vacuum chuck, magnetic chuck or mechanical structure fixture;

a test piece installed on the test piece fixture;

a Z-direction feeding device that is installed on a top surface of the workbench and feeds in a rotation axis direction of the air-bearing turntable; the Z-direction feeding device is installed on the top surface of the workbench through a threaded connection, with a positioning accuracy better than 5 μm;

a nano positioning stage installed to the Z-direction feeding device through a nano positioning stage connection piece;

a force sensor installed to the nano positioning stage through a force sensor connection piece; the force sensor has a function of measuring normal force and tangential force, and normal direction is Z direction, and tangential direction is X direction; and a scratch tool installed to the force sensor through a scratch tool connection piece;

wherein the test piece is non-ferrous metal, ferrous metal or hard brittle material, a micro convex structure with controllable length and height is machined in a position of the test piece to be scratched, and a length $L_x$ along a scratch direction of the micro convex structure corresponding to a scratch depth d satisfies the following formula:

$$L_X \geq \frac{vq}{f}$$

wherein, v is a scratch speed required for the test, m/s; q is a quantity of force signal points required for the test in an effective scratch area; and f is a sampling frequency set by the force sensor, Hz;

a length $L_y$ of the micro convex structure along a radial direction is no less than a feeding step length $l_y$ of the scratch tool along a Y direction in a scratch process;

a maximum height H of the micro convex structure along the Z direction is larger than a maximum cutting depth $d_{max}$ required for the test; and a Y-section shape of the micro convex structure is arc-shaped or polyline-shaped, and an arc radius or a straight slope is selected according to the scratch speed, the scratch depth and scratch length set by the scratch test.

Further, the air-bearing turntable is driven by a servo motor, the servo motor is installed on a bottom surface of the workbench, and the air-bearing turntable is connected to the servo motor through a belt; the air-bearing turntable is an air bearing mechanical air-bearing turntable; an end face runout and a radial runout of the air-bearing turntable are both less than 0.5 μm; and relative positions of the air-bearing turntable, the test piece fixture and the test piece are fixed in the Z direction.

Further, a shape of the test piece is centrosymmetry about Z axis, the micro convex structure with controllable length and height is machined in the position of the test piece to be scratched, and is fixedly installed to the air-bearing turntable through the test piece fixture, and a central centrosymmetry axis of the test piece coincides with a rotation axis of the turntable.

Further, the shape of the test piece is centrosymmetry about the Z axis and a thickness of the test piece is less than 1 mm, an elastic film with a length (Y direction) of no less than 5 mm, a width (X direction) of no less than 1 mm and a height (Z direction) of no less than 10 mm is pasted on a back of the test piece, and at the moment, a magnetic chuck or a vacuum chuck with a flat surface is used for clamping, during a clamping process, the flat surface of the vacuum chuck/magnetic chuck and the elastic film are used to elastically deform a surface of the test piece through vacuum adsorption/magnetic adsorption to form the micro convex structure with controllable length, width and height, and the centrosymmetry axis of the test piece coincides with the rotation axis of the air-bearing turntable.

Further, the test piece is a block test piece with irregular shape, and the micro convex structure with controllable length and height is machined in the position of the test piece to be scratched; the test piece is clamped on an end face of the air-bearing turntable through the test piece fixture; in order to ensure a dynamic balance of the end face of the air-bearing turntable in a high-speed rotary motion, a balancing block is additionally installed on the test piece fixture, and a gravity center of the balancing block and a gravity center of the test piece are centrosymmetric about the rotation axis of the air-bearing turntable.

Further, the scratch tool comprises a single-point tool and a fixed seat of single-point tool, and the material of the single-point tool is the material with higher hardness than that of the test piece and the characteristic of machining a sharp point of micron/submicron curvature radius, comprising diamond, cubic boron nitride (CBN) or ceramic; and the single-point tool is fixed on a top end of the fixed seat through bonding, brazing or electroplating.

Further, the nano positioning stage is a nano linear displacement platform, which realizes linear displacement with nanometer precision in a vertical direction (i.e. the Z direction) and a radial direction (i.e. the Y direction) of the end face of the air-bearing turntable; the nanometer linear displacement platform is installed to the Z-direction feeding device through the nano positioning stage connection piece, the precision of a Z-direction closed-loop linear motion is better than 10 nm, a stroke of the Z-direction closed-loop linear motion is no less than 10 μm, the precision of a Y-direction closed-loop linear motion is better than 100 nm, and the stroke of the Y-direction closed-loop linear motion is no less than 100 μm.

Further, the nano positioning stage is a nano linear stage, which realizes linear displacement with nanometer precision in a vertical direction (i.e. the Z direction), realizes deflection motion around an X axis, and indirectly realizes micro feed in a radial direction (i.e. the Y direction) and a vertical direction (i.e. the Z direction) of the air-bearing turntable through adjusting a deflection radius; the precision of a Z-direction closed-loop linear motion is better than 10 nm, a stroke of the Z-direction closed-loop motion is no less than 10 μm, the precision of an X-direction closed-loop deflection motion is better than 1 μrad, and a stroke of the X-direction closed-loop deflection motion is no less than ±0.5 mrad.

Further, a test method of a nanometer cutting depth high-speed single-point scratch test device comprises the following steps of:

A. clamping a test piece selecting a mode for clamping the test piece according to a shape of the test piece, if the test piece is an axisymmetric shape, performing step A1, and if the test piece is a block test piece of an irregular shape, performing step A2;

A1. for the test piece of the axisymmetric shape, machining a micro convex structure with controllable length and height in a position of the test piece to be scratched, and fixedly installing the micro convex structure to an air-bearing turntable through a test piece fixture; performing step B;

A2. for the block test piece of the irregular shape, machining the micro convex structure with controllable length and height in the position of the test piece to be scratched, clamping the test piece on an end face of the air-bearing turntable through the test piece fixture, and installing a corresponding balancing block to ensure a dynamic balance of the end face of the air-bearing turntable in high-speed rotary motion, wherein a gravity center of the balancing block and a gravity center of the test piece are centrosymmetric about a rotation axis of the air-bearing turntable;

B. controlling a scratch tool to approach a surface of the test piece through a Z-direction feeding device;

rotating the air-bearing turntable so that the micro convex structure on a surface of the test piece to be scratched is located directly below the scratch tool;

pasting a protective film with a thickness of T on the micro convex structure of the test piece, controlling the scratch tool to move to a negative limit position of the nano positioning stage in a radial direction (i.e. Y direction), and controlling the Z-direction feeding device to enable the scratch tool to rapidly approach the micro convex structure of the test piece by using an online micro-observation system;

C. adjusting tool

C1. opening a locking mechanism of the Z-direction feeding device;

C2. controlling the scratch tool to step toward the test piece according to a step length smaller than the thickness T of an elastic film in the Z direction through the nano positioning stage;

C31. if a force sensor detects a significant increase in force signals, that is, the scratch tool contacts the protective film adhered to the micro convex structure of the test piece, performing step C6; otherwise, performing step C32;

C32. if the nano positioning stage steps toward the negative limit position in the Z direction, performing step C4; otherwise, performing step C2;

C4. unlocking the locking mechanism of the Z-direction feeding device, and controlling the nano positioning stage to lift to a positive limit position in the Z direction;

C5. controlling the Z-direction feeding device to feed a specified distance in a direction of the test piece, wherein the distance does not exceed a difference value between a stroke limit of the nano positioning stage in the Z direction and the positioning precision of the Z-direction feeding device; performing step C1;

C6. stopping the feeding of the nano positioning stage in the Z direction, removing the protective film, and completing the step of adjusting tool (at the moment, a distance between the scratch tool and the position of the test piece to be scratched does not exceed the thickness T of the protective film);

D. scratching the test piece starting the air-bearing turntable, and calculating and setting a rotation speed n of the air-bearing turntable according to the following formula, with the unit of rpm:

$$n = \frac{30v}{\pi R}$$

wherein, R is a rotation radius of the end face of the air-bearing turntable where the micro convex structure is located, m; v is a scratch speed required for a scratch test, m/s; and the test piece is clamped on the test piece fixture and rotates with the air-bearing turntable according to the set rotation speed n;

controlling the nano positioning stage and the Z-direction feeding device to implement an alternative scratch feeding strategy, wherein the alternative scratch feeding strategy comprises the following feeding motions of:

D1. opening the locking mechanism of the Z-direction feeding device;

D2. controlling the scratch tool to step feed to the test piece according to the step length of 10 to 1000 nm through the nano positioning stage, wherein the stepping feed is decomposed into the feed in a negative Z direction and the feed in a negative Y direction; in the case of single scratch of the same residual imprint, performing step D21; and in the case of multiple scratches of the same residual imprint, performing step D22;

D21. for the single scratch of the same residual imprint, driving the test piece to rotate every one revolution by the air-bearing turntable, a component $f_z$ of the step length of the stepping feed of the scratch tool in the Z direction is no less than a minimum cutting depth $d_{min}$ required for the scratch test and no more than a maximum cutting depth $d_{max}$ required for the scratch test, i.e., $d_{min} \leq f_z \leq d_{max}$; and a component $f_y$ of the step length of the stepping feed of the scratch tool in a radial direction (i.e. the Y direction) of the end surface of the air-bearing turntable is no less than 10 µm, so that scratches distributed in the Y direction with gradually changed cutting depths are independent of each other and do not interfere with each other; performing step D3;

D22. for the multiple scratches of the same residual imprint, after one step is completed in the stepping feed motion of the scratch tool, staying for a time t, until a quantity s of scratches required for the test is reached, and continuing to feed to the test piece step by step, wherein the residence time t satisfies $s/n \leq t < (s+1)/n$; a component $f_z$ of the step length of the stepping feed of the scratch tool in the Z direction is no less than a minimum cutting depth $d_{min}$ required for the scratch test and no more than a maximum cutting depth $d_{max}$ required for the scratch test, i.e., $d_{min} \leq f_z \leq d_{max}$; and a component $f_y$ of the step length of the stepping feed of the scratch tool in a radial direction (i.e. the Y direction) of the end face of the air-bearing turntable is no less than 10 µm, so that scratches distributed in the Y direction with gradually changed cutting depths are independent of each other and do not interfere with each other;

D3. if the cumulative displacement of the stepping feed in the Z direction exceeds the maximum cutting depth required for the test, or the nano positioning stage moves to a negative limit position in the Y direction, or the cumulative displacement of the stepping feed in the Z direction reaches a negative limit position in Z direction of the nano positioning stage, stopping the stepping feed, and performing step D31; otherwise, quantity step D2;

D31. analyzing the force signals collected by the force sensor during feed, if the scratch force signals are detected, indicating the high-speed scratch conducted by the scratch tool on the surface of the micro convex structure of the test piece, and quantity step D5; otherwise, performing step D32;

D32. if the nano positioning stage has reached the negative limit position in the Y direction, controlling the nano positioning stage to move to a positive limit position in the Y direction, and performing step D2; otherwise, performing step D33;

D33. if the nano positioning stage has reached the negative limit position in the Z direction, performing step D4; otherwise, performing step D2;

D4. unlocking the locking mechanism of the Z-direction feeding device, and controlling the scratch tool to feed to the surface of the test piece through the Z-direction feeding device, so that the scratch tool further approaches the surface of the test piece; in order to avoid the scratch tool coming into contact with the micro convex structure in the approaching process, a feeding amount of the Z-direction feeding device does not exceed a difference value between a stroke of the nano positioning stage in the Z direction and a positioning precision of the Z-direction feeding device, and controlling the nano positioning stage to move to the positive limit position in the Z direction; and performing step D1; and D5. unlocking the locking mechanism of the Z-direction feeding device, controlling the scratch tool to lift up through the Z-direction feeding device, stopping the air-bearing turntable, and completing the scratch test.

Further, when a thickness of the test piece of axisymmetric shape in step A2 is less than 1 mm, an elastic film with a length no less than 5 mm, a width no less than 1 mm and a height no less than 10 µm is pasted on a back of the test piece, a magnetic chuck or a vacuum chuck with a flat surface is used for clamping, in the clamping process, the flat surface of the vacuum chuck/magnetic chuck and the elastic film are used to elastically deform the surface of the test piece through vacuum adsorption/magnetic adsorption to form the micro convex structure with controllable length, width and height.

Compared with the background art, the present disclosure has the following advantages.

1. The machining speed of the abrasive particle in the ultra-precision grinding process is truly restored. The air bearing mechanical air-bearing turntable is selected in the present disclosure, high-speed scratch is realized by high-speed rotary motion with high precision and low face runout, and the micro convex structure on the surface of the scratch test piece and a graded precision motion system composed of the nano positioning stage and the Z-direction feeding device are used to realize the controllable of the scratch depth on the nanometer magnitude. Compared with the current scratch method, the present disclosure improves the scratch speed from µm/s to m/s, and truly restores the machining speed of the abrasive particle in the ultra-precision grinding process; and in terms of scratch depth, nanometer-magnitude control is realized; and in terms of scratch tool size, high-speed scratch of the scratch tool of micron/submicron curvature radius is realized.

2. Scratch force signals under different nanometer cutting depth conditions are accurately collected under the high-speed scratch condition, and the scratch force-scratch depth correlation is explicit. According to the present disclosure, the micro convex structure is constructed on the surface of the test piece, compared with the pendulum scratch method, the scratch length under the nanometer cutting depth is effectively prolonged, and meanwhile, the micro convex structure of the area to be scratched also realizes the gradually changed the scratch depth in the scratch process. Furthermore, on the basis of ensuring that the scratch force-scratch depth correlation is explicit, sufficient scratch force signals corresponding to different cutting depths are accurately collected.

3. The scratch length can be controlled. The micro convex structure is constructed on a surface of the test piece according to the present disclosure, so that very long residual imprints are left on a surface of the whole wafer by a diamond needle point is avoided, abundant test data are provided in shorter residual imprints, a content of effective information in a unit scratch length is greatly increased, following residual imprint analysis and feature identification of remaining residual imprints are facilitated, and meanwhile, the integrity of the scratch tool is guaranteed through controlling the overall lengths of residual imprints.

BRIEF DESCRIPTION OF THE DRAWINGS

In the drawings: 1—base; 2—workbench; 3—air-bearing turntable; 4—test piece fixture; 5—test piece; 6—scratch tool; 7—scratch tool connection piece; 8—force sensor; 9—force sensor connection piece; 10—nano positioning stage; 11—nano positioning stage connection piece; 12—Z-direction feeding device; 13—elastic film; and 14—micro convex structure.

DETAILED DESCRIPTION OF THE PREFERRED EMBODIMENTS

Figure 1:
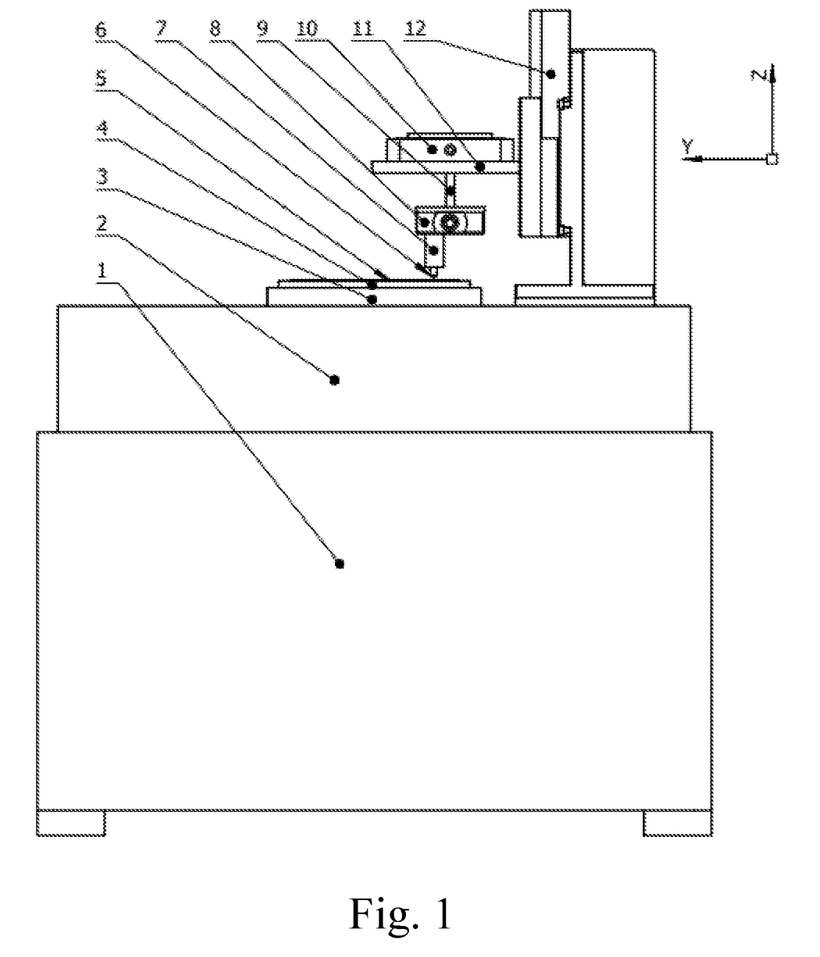
FIG. 1 illustrates a front view of a test device according to the present disclosure.
Figure 2:
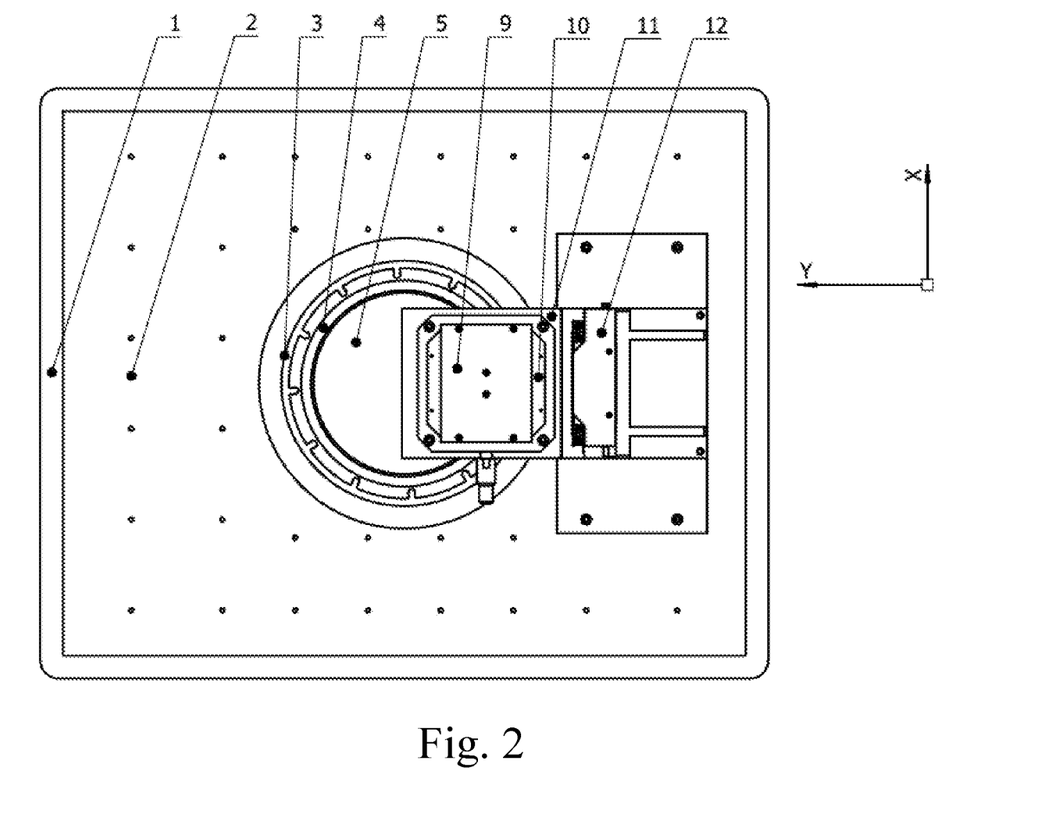
FIG. 2 illustrates a top view of FIG. 1.
Figure 3:
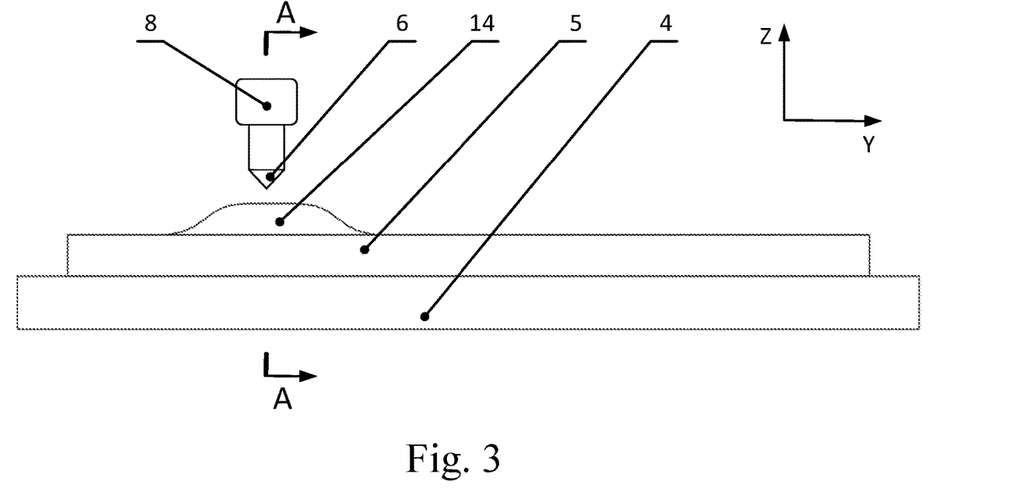
FIG. 3 illustrates a diagram of a micro convex structure of a workpiece.
Figure 4:
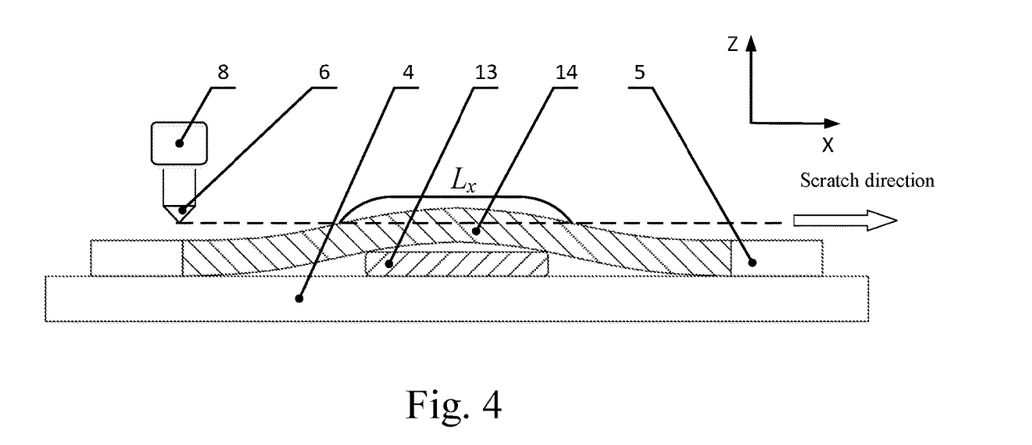
FIG. 4 illustrates an A-A section view of FIG. 3.

The present disclosure is further described hereinafter with reference to the drawings. As shown in FIGS. 1 to 4, a nanometer cutting depth high-speed single-point scratch test device comprises:

a base 1;

a horizontally arranged workbench 2 fixedly installed on a top surface of the base 1;

a vertically arranged air-bearing turntable 3 fixedly installed on the workbench 2;

a test piece fixture 4 that is installed on an end face of a top portion of the air-bearing turntable 3 and is coaxial with the air-bearing turntable 3, the air-bearing turntable 3 drives the test piece fixture 4 to rotate, and the test piece fixture 4 is vacuum chuck, magnetic chuck or mechanical structure fixture;

a test piece 5 installed on the test piece fixture 4;

a Z-direction feeding device 12 that is installed on a top surface of the workbench 2 and feeds in a rotation axis direction of the air-bearing turntable 3; the Z-direction feeding device 12 is installed on the top surface of the workbench 2 through threaded connection, with a positioning precision better than 5 μm;

a nano positioning stage 10 installed to the Z-direction feeding device 12 through a nano positioning stage connection piece 11;

a force sensor 8 installed to the nano positioning stage 10 through a force sensor connection piece 9; the force sensor 8 has a function of measuring normal force and tangential force, and normal direction is Z direction, and tangential direction is an X direction; and a scratch tool 6 installed to the force sensor 8 through a scratch tool connection piece 7;

wherein the test piece 5 is non-ferrous metal, ferrous metal or hard brittle material, a micro convex structure 14 with controllable length and height is machined in a position of the test piece 5 to be scratched, and a length $L_x$ along a scratch of the micro convex structure 14 corresponding to a scratch depth d satisfies the following formula:

$$L_X \geq \frac{vq}{f}$$

wherein, v is a scratch speed required for the test, m/s; q is a quantity of force signal points required for the test in an effective scratch area; and f is a sampling frequency set by the force sensor 8, Hz;

a length $L_y$ of the micro convex structure 14 along a radial direction is no less than a feeding step length $l_y$ of the scratch tool 6 in a Y direction in a scratch process;

a maximum height H of the micro convex structure 14 along the Z direction is larger than a maximum cutting depth $d_{max}$ required for the test; and a Y-section shape of the micro convex structure 14 is arc-shaped or polyline-shaped, and an arc radius or a straight slope is selected according to the scratch speed, scratch depth and scratch length set by the scratch test.

Further, the air-bearing turntable 3 is driven by a servo motor, the servo motor is installed on a bottom surface of the workbench 2, and the air-bearing turntable 3 is connected to the servo motor through a belt; the air-bearing turntable 3 is an air bearing mechanical air-bearing turntable 3; an end face runout and a radial runout of the air-bearing turntable 3 are both less than 0.5 μm; and relative positions of the air-bearing turntable 3, the test piece fixture 4 and the test piece 5 are fixed in the Z direction.

Further, a shape of the test piece 5 is centrosymmetry about Z axis, the micro convex structure 14 with controllable length and height is machined in the position of the test piece 5 to be scratched, and is fixedly installed to the air-bearing turntable 3 through the test piece fixture 4, and a centrosymmetry axis of the test piece 5 coincides with a rotation axis of the turntable.

Further, the shape of the test piece 5 is centrosymmetry about Z axis and a thickness of the test piece 5 is less than 1 mm, an elastic film 13 with a length no less than 5 mm, a width no less than 1 mm and a height no less than 10 mm is pasted on a back of the test piece 5, and a magnetic chuck or a vacuum chuck with a flat surface is used for clamping, during a clamping process, the flat surface of the vacuum chuck/magnetic chuck and the elastic film 13 are used to elastically deform a surface of the test piece 5 through vacuum adsorption/magnetic adsorption to form the micro convex structure 14 with controllable length, width and height, and the central centrosymmetry axis of the test piece 5 coincides with the rotation axis of the air-bearing turntable 3.

Further, the test piece 5 is a block test piece 5 with irregular shape, and the micro convex structure 14 with controllable length and height is machined in the position of the test piece 5 to be scratched; the test piece 5 is clamped on an end face of the air-bearing turntable 3 through the test piece fixture 4; in order to ensure a dynamic balance of the end face of the air-bearing turntable 3 in a high-speed rotary motion, a balancing block is additionally installed on the test piece fixture 4, and a gravity center of the balancing block and a gravity center of the test piece 5 are centrosymmetric about the rotation axis of the air-bearing turntable 3.

Further, the scratch tool 6 comprises a single-point tool and a fixed seat of single-point tool, and the material of the single-point tool is the material with higher hardness than that of the test piece 5 and has the characteristic of machining a sharp point of micron/submicron curvature radius, comprising diamond, cubic boron nitride or ceramic; and the single-point tool is fixed on a top end of the fixed seat through bonding, brazing or electroplating.

Further, the nano positioning stage 10 is a nanometer linear displacement platform, which realizes linear displacement with nanometer precision in a vertical direction (i.e. the Z direction) and a radial direction of the end face of the air-bearing turntable 3 (i.e. the Y direction); the nanometer linear displacement platform is installed to the Z-direction feeding device 12 through the nano positioning stage connection piece 11, the precision of a Z-direction closed-loop linear motion is better than 10 nm, a stroke of the Z-direction closed-loop linear motion is no less than 10 µm, the precision of a Y-direction closed-loop linear motion is better than 100 nm, and the stroke of the Y-direction closed-loop linear motion is no less than 100 µm.

Further, the nano positioning stage 10 is a nano linear stage, which realizes linear displacement with nanometer precision in a vertical direction (i.e. the Z direction), and realizes deflection motion around an X axis, and indirectly realizes micro feed in a radial direction (i.e. the Y direction) and a vertical direction (i.e. the Z direction) of the air-bearing turntable 3 through adjusting a deflection radius; the precision of a Z-direction closed-loop linear motion is better than 10 nm, a stroke of the Z-direction closed-loop motion is no less than 10 µm, the precision of an X-direction closed-loop deflection motion is better than 1 µrad, and a stroke of the X-direction closed-loop deflection motion is no less than ±0.5 mrad.

Figure 5:
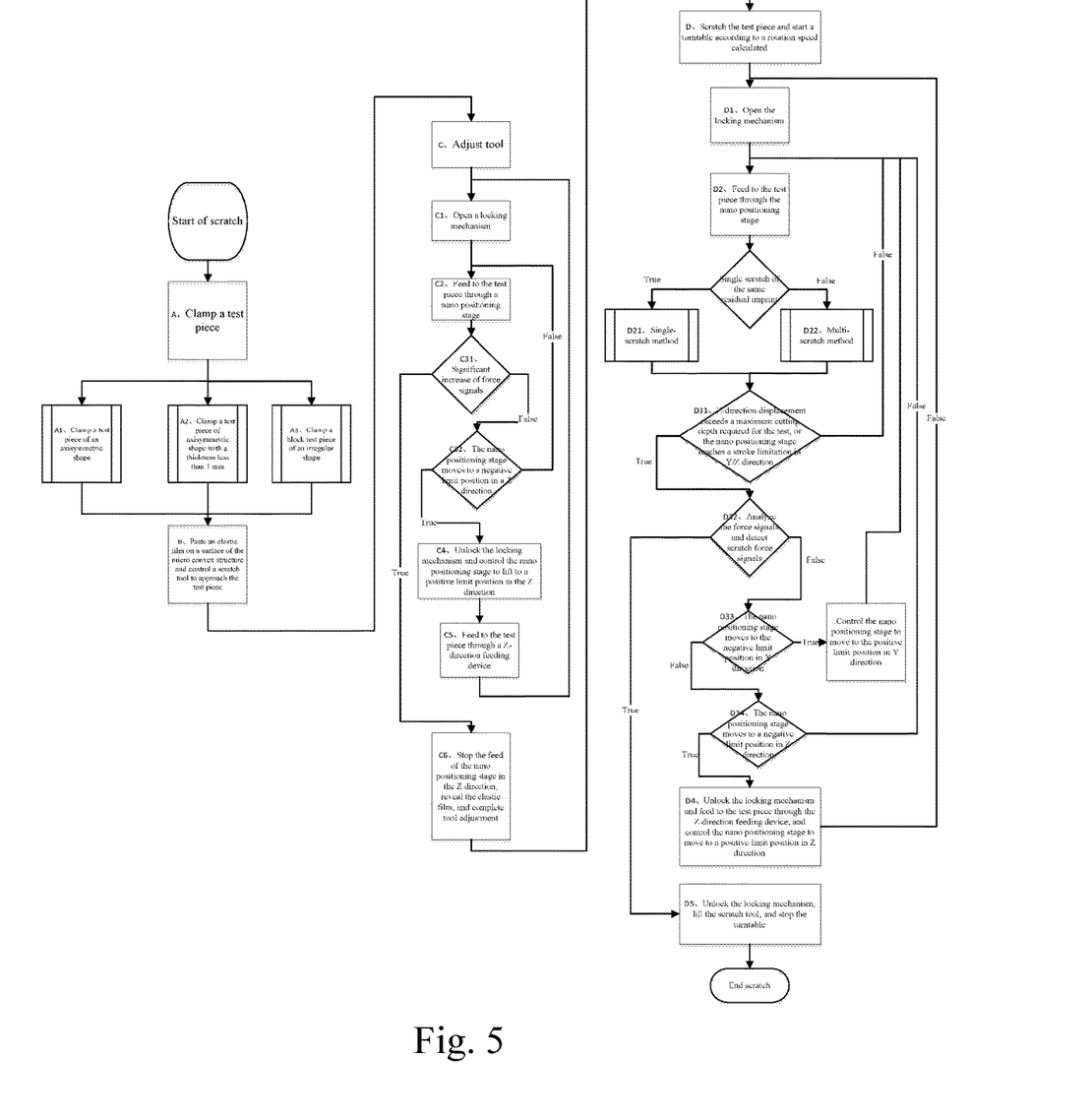
FIG. 5 illustrates a flow chart of a test method according to the present disclosure.

As shown in FIGS. 1 to 5, a test method of a nanometer cutting depth high-speed single-point scratch test device comprises the following steps of:

A. clamping a test piece 5;

selecting a mode for clamping the test piece 5 according to a shape of the test piece 5, if the test piece 5 is an axisymmetric shape, performing step A1, and if the test piece 5 is a block test piece of an irregular shape, performing step A2;

A1. for the test piece of the axisymmetric shape, machining a micro convex structure 14 with controllable length and height in a position of the test piece 5 to be scratched, and fixedly installing the micro convex structure 14 to an air-bearing turntable 3 through a test piece fixture 4; performing step B;

A2. for the block test piece of the irregular shape, machining the micro convex structure 14 with controllable length and height in the position of the test piece 5 to be scratched, clamping the test piece 5 on an end face of the air-bearing turntable 3 through the test piece fixture 4, and installing a corresponding balancing block to ensure a dynamic balance of the end face of the air-bearing turntable 3 in high-speed rotary motion, wherein a gravity center of the balancing block and a gravity center of the test piece 5 are centrosymmetric about a rotation axis of the air-bearing turntable 3;

B. controlling a scratch tool 6 to approach a surface of the test piece 5 through a Z-direction feeding device 12;

rotating the air-bearing turntable 3 so that the micro convex structure 14 on a surface of the test piece 5 to be scratched is located directly below the scratch tool 6;

pasting a protective film with a thickness of T on the micro convex structure 14 of the test piece 5, controlling the scratch tool 6 to move to a negative limit position of the nano positioning stage 10 in a radial direction, and controlling the Z-direction feeding device 12 to enable the scratch tool 6 to rapidly approach the micro convex structure 14 of the test piece 5 by using an online micro-observation system;

C. adjusting tool

C1. opening a locking mechanism of the Z-direction feeding device 12;

C2. controlling the scratch tool 6 to step toward the test piece 5 according to a step length smaller than the thickness T of an elastic film 13 in the Z direction through the nano positioning stage 10;

C31. if a force sensor 8 detects a significant increase in force signals, that is, the scratch tool 6 contacts the protective film adhered to the micro convex structure 14 of the test piece 5, performing step C6; otherwise, performing step C32;

C32. if the nano positioning stage 10 steps toward the negative limit position in the Z direction, performing step C4; otherwise, performing step C2;

C4. unlocking the locking mechanism of the Z-direction feeding device 12, and controlling the nano positioning stage 10 to lift to a positive limit position in the Z direction;

C5. controlling the Z-direction feeding device 12 to feed a specified distance in a direction of the test piece 5, wherein the distance does not exceed a difference value between a stroke limit of the nano positioning stage 10 in the Z direction and the positioning precision of the Z-direction feeding device 12; and performing step C1;

C6. stopping the feeding of the nano positioning stage 10 in the Z direction, removing the protective film, and completing the step of adjusting tool;

D. scratching the test piece 5 starting the air-bearing turntable 3, and calculating and setting a rotation speed n of the air-bearing turntable 3 according to the following formula, with the unit of rpm:

$$n = \frac{30v}{\pi R}$$

wherein, R is a rotation radius of the end face of the air-bearing turntable 3 where the micro convex structure 14 is located, m; v is a scratch speed required for a scratch test, m/s; and the test piece 5 is clamped on the test piece fixture 4 and rotates with the air-bearing turntable 3 according to the set rotation speed n;

controlling the nano positioning stage 10 and the Z-direction feeding device 12 to implement an alternative scratch feeding strategy, wherein the alternative scratch feeding strategy comprises the following feeding motions of:

D1. opening the locking mechanism of the Z-direction feeding device 12;

D2. controlling the scratch tool 6 to step feed to the test piece 5 according to the step length of 10 to 1000 nm through the nano positioning stage 10, wherein the stepping feed is decomposed into the feed in a negative Z direction and the feed in a negative Y direction; in the case of single scratch of the same residual imprint, performing step D21; and in the case of multiple scratches of the same residual imprint, performing step D22;

D21. for the single scratch of the same residual imprint, driving the test piece 5 to rotate every one revolution by the air-bearing turntable 3, a component $f_z$ of the step length of the stepping feed of the scratch tool 6 in the Z direction is no less than a minimum cutting depth $d_{min}$ required for the scratch test and no more than a maximum cutting depth $d_{max}$ required for the scratch test, i.e., $d_{min} \leq f_z \leq d_{max}$; and a component $f_y$ of the step length of the stepping feed of the scratch tool 6 in a radial direction (i.e. the Y direction) of the end face of the air-bearing turntable 3 is no less than 10 μm, so that scratches distributed in the Y direction with gradually changed cutting depths are independent of each other and do not interfere with each other; and performing step D3;

D22. for the multiple scratches of the same residual imprint, after one step is completed in the stepping feed motion of the scratch tool 6, staying for time t until a quantity s of scratches required for the test is reached, and continuing to feed to the test piece 5 step by step, wherein the residence time satisfies $s/n \leq t < (s+1)/n$; a component $f_z$ of the step length of the stepping feed of the scratch tool 6 in the Z direction is no less than a minimum cutting depth $d_{min}$ required for the scratch test and no more than a maximum cutting depth $d_{max}$ required for the scratch test, i.e., $d_{min} \leq f_z \leq d_{max}$; and a component $f_y$ of the step length of the stepping feed of the scratch tool 6 in a radial direction (i.e. the Y direction) of the end surface of the air-bearing turntable 3 is no less than 10 μm, so that scratches distributed in the Y direction with gradually changed cutting depths are independent of each other and do not interfere with each other;

D3. if the cumulative displacement of the stepping feed in the Z direction exceeds the maximum cutting depth required for the test, or the nano positioning stage 10 moves to a negative limit position in the Y direction, or the cumulative displacement of the stepping feed in the Z direction reaches a negative limit position in Z direction of the nano positioning stage 10, stopping the stepping feed, and performing step D31; otherwise, performing step D2;

D31. analyzing the force signals collected by the force sensor 8 during feed, if the scratch force signals are detected, indicating the high-speed scratch conducted by the scratch tool 6 on the surface of the micro convex structure 14 of the test piece 5, and performing step D5; otherwise, performing step D32;

D32. if the nano positioning stage 10 has reached the negative limit position in the Y direction, controlling the nano positioning stage 10 to move to a positive limit position in the Y direction, and performing step D2; otherwise, performing step D33;

D33. if the nano positioning stage 10 has reached the negative limit position in the Z direction, performing step D4; otherwise, performing step D2;

D4. unlocking the locking mechanism of the Z-direction feeding device 12, and controlling the scratch tool 6 to feed to the surface of the test piece 5 through the Z-direction feeding device 12, so that the scratch tool 6 further approaches the surface of the test piece 5; in order to avoid the scratch tool 6 coming into contact with the micro convex structure 14 in the approaching process, a feeding amount of the Z-direction feeding device 12 does not exceed a difference value between a stroke of the nano positioning stage 10 in the Z direction and a positioning precision of the Z-direction feeding device 12, and controlling the nano positioning stage 10 to move to the positive limit position in the Z direction; and performing step D1; and D5. unlocking the locking mechanism of the Z-direction feeding device 12, controlling the scratch tool 6 to lift up through the Z-direction feeding device 12, stopping the air-bearing turntable 3, and completing the scratch test.

Further, when a thickness of the test piece 5 of axisymmetric shape in step A2 is less than 1 mm, an elastic film 13 with a length no less than 5 mm, a width no less than 1 mm and a height no less than 10 μm is pasted on a back of the test piece 5, a magnetic chuck or a vacuum chuck with a flat surface is used for clamping, in the clamping process, the flat surface of the vacuum chuck/magnetic chuck and the elastic film 13 are used to elastically deform the surface of the test piece 5 through vacuum adsorption/magnetic adsorption to form the micro convex structure 14 with controllable length, width and height.

The present disclosure is not limited to the embodiments, and any equivalent concept or change within the technical scope disclosed by the present disclosure is listed as the protection scope of the present disclosure.

The invention claimed is:

1. A scratch test device, comprising:
a base;
a horizontally arranged workbench fixedly installed on a top surface of the base;
a vertically arranged air-bearing turntable fixedly installed on the workbench;
a test piece fixture installed on an end face of a top portion of the air-bearing turntable and coaxially arranged with the air-bearing turntable, wherein, the air-bearing turntable drives the test piece fixture to rotate and the test piece fixture is a vacuum chuck, a magnetic chuck, or a mechanical structure fixture;
a test piece installed on the test piece fixture;
a Z-direction feeding device installed on a top surface of the workbench and configured to feed in a rotational axial direction of the air-bearing turntable;
a nano positioning stage installed to the Z-direction feeding device through a nano positioning stage connection piece;
a force sensor affixed to the nano-positioning stage through a force sensor connection piece, wherein the force sensor is configured to measure a normal force in a Z-direction and a tangential force in a X-direction; and
a scratch tool affixed to the force sensor through a scratch tool connection piece,
wherein a micro convex structure with controllable length and height is machined in a position of the test piece to be scratched, and a scratch length $L_x$ along a scratch direction of the micro convex structure corresponding to a scratch depth d satisfies the following relation:

$$L_x \geq \frac{vq}{f}$$

wherein v is a scratch speed required for the test; q is a quantity of force signal points required for the test in an effective scratch area; and f is a sampling frequency set by the force sensor;
a length $L_y$ of the micro convex structure along a radial direction is no less than a feeding step length $l_y$ of the scratch tool along a Y direction in a scratch process;

a maximum height H of the micro convex structure along the Z direction is larger than a maximum cutting depth $d_{max}$ required for the test; and a Y-section shape of the micro convex structure is arc-shaped or polyline-shaped, and an arc radius or a straight slope is selected according to the scratch speed, the scratch depth, and the scratch length set by the scratch test.

2. The scratch test device according to claim 1, wherein the air-bearing turntable is driven by a servo motor installed on a bottom surface of the workbench, and the air-bearing turntable is connected to the servo motor through a belt; the air-bearing turntable is an air bearing mechanical air-bearing turntable; an end face runout and a radial runout of the air-bearing turntable are both less than 0.5 µm; and relative positions of the air-bearing turntable, the test piece fixture and the test piece are fixed in the Z direction.

3. The scratch test device according to claim 1, wherein a shape of the test piece is centrosymmetry about the Z axis, the micro convex structure is machined in the position of the test piece to be scratched, and is affixed to the air-bearing turntable through the test piece fixture, and a centrosymmetry axis of the test piece coincides with a rotational axis of the air-bearing turntable.

4. The scratch test device according to claim 1, wherein the shape of the test piece is centrosymmetry about the Z axis and a thickness of the test piece is less than 1 mm, an elastic film having a length of no less than 5 mm, a width of no less than 1 mm, and a height of no less than 10 mm is pasted on a back of the test piece, and the magnetic chuck or the vacuum chuck having a flat surface is used for clamping, during a clamping process, the flat surface of the vacuum chuck/magnetic chuck and the elastic film are used to elastically deform a surface of the test piece through vacuum adsorption/magnetic adsorption to form the micro convex structure, and the centrosymmetry axis of the test piece coincides with a rotational axis of the air-bearing turntable.

5. The scratch test device according to claim 1, wherein the test piece is a block test piece having an irregular shape, and is clamped on an end face of the air-bearing turntable through the test piece fixture in order to ensure a dynamic balance of the end face of the air-bearing turntable in a rotary motion, a balancing block is additionally installed on the test piece fixture and a gravity center of the balancing block and a gravity center of the test piece are centrosymmetric about a rotational axis of the air-bearing turntable.

6. The scratch test device according to claim 1, wherein the scratch tool comprises a single-point tool and a fixed seat, and is made of a material that is diamond, cubic boron nitride, or ceramic; and the single-point tool is affixed to a top end of the fixed seat through bonding, brazing, or electroplating.

7. The scratch test device according to claim 1, wherein the nano positioning stage is a nanometer linear displacement platform, which realizes a linear displacement in the Z direction and the Y direction, the nanometer linear displacement platform is affixed to the Z-direction feeding device through the nano positioning stage connection piece, a precision of a Z-direction closed-loop linear motion is better than 10 nm, a stroke of the Z-direction closed-loop linear motion is no less than 10 µm, a precision of a Y-direction closed-loop linear motion is better than 100 nm, and a stroke of the Y-direction closed-loop linear motion is no less than 100 µm.

8. The scratch test device according to claim 1, wherein the nano positioning stage is a nano linear stage, which realizes linear displacement with a nanometer precision in the Z direction and a deflection motion around an X axis, and indirectly realizes a micro feed in the Y direction and the Z direction) of the air-bearing turntable by adjusting a deflection radius; a precision of a Z-direction closed-loop linear motion is better than 10 nm, a stroke of the Z-direction closed-loop motion is no less than 10 µm, a precision of an X-direction closed-loop deflection motion is better than 1 µrad, and a stroke of the X-direction closed-loop deflection motion is no less than ±0.5 mrad.

9. A test method of a scratch test device, comprising:

A. clamping a test piece selecting a mode for clamping the test piece according to a shape of the test piece, when the test piece is an axisymmetric shape, performing step A1, and when the test piece is a block test piece of an irregular shape, performing step A2;

A1. for the test piece of the axisymmetric shape, machining a micro convex structure having a controllable length and height in a position of the test piece to be scratched, and fixedly installing the micro convex structure on an air-bearing turntable through a test piece fixture; then performing step B;

A2. for the block test piece of the irregular shape, machining the micro convex structure in the position of the test piece to be scratched, clamping the test piece on an end face of the air-bearing turntable through the test piece fixture, and installing a corresponding balancing block to ensure a dynamic balance of the end face of the air-bearing turntable in a high-speed rotary motion, wherein a gravity center of the balancing block and a gravity center of the test piece are centrosymmetric about a rotational axis of the air-bearing turntable;

B. controlling a scratch tool to approach a surface of the test piece through a Z-direction feeding device;

rotating the air-bearing turntable so that the micro convex structure on a surface of the test piece to be scratched is located directly below the scratch tool;

pasting a protective film with a thickness of T on the micro convex structure of the test piece, controlling the scratch tool to move to a negative limit position of a nano positioning stage in a radial direction, and controlling the Z-direction feeding device to enable the scratch tool to rapidly approach the micro convex structure of the test piece by using an online micro-observation system;

C. adjusting tool

C1. opening a locking mechanism of the Z-direction feeding device;

C2. controlling the scratch tool to step toward the test piece at a step length smaller than the thickness T of an elastic film in the Z direction through the nano positioning stage;

C31. when a force sensor detects a significant increase in force signals, that is, the scratch tool contacts the protective film adhered to the micro convex structure of the test piece, performing step C6; otherwise, performing step C32;

C32. when the nano positioning stage steps toward the negative limit position in the Z direction, performing step C4; otherwise, performing step C2;

C4. unlocking the locking mechanism of the Z-direction feeding device, and controlling the nano positioning stage to lift to a positive limit position in the Z direction;

C5. controlling the Z-direction feeding device to feed a specified distance in a direction of the test piece, wherein the distance does not exceed a difference value between a stroke limit of the nano positioning stage in the Z direction and the positioning precision of the Z-direction feeding device; then performing step C1;

C6. stopping the feeding of the nano positioning stage in the Z direction, removing the protective film, and completing the step of adjusting tool;

D. scratching the test piece starting the air-bearing turntable, and calculating and setting a rotation speed n of the air-bearing turntable (3) according to the following formula, with the unit of rpm:

$$n = \frac{30v}{\pi R}$$

wherein, R is a rotation radius of the end face of the air-bearing turntable where the micro convex structure is located, v is a scratch speed required for a scratch test, and the test piece is clamped on the test piece fixture and rotates with the air-bearing turntable according to the set rotation speed n;

controlling the nano positioning stage and the Z-direction feeding device to implement an alternative scratch feeding strategy, wherein the alternative scratch feeding strategy comprises the following feeding motions of:

D1. opening the locking mechanism of the Z-direction feeding device;

D2. controlling the scratch tool to step feed to the test piece at a step length of 10 to 1000 nm through the nano positioning stage, wherein the stepping feed is decomposed into the feed in a negative Z direction and the feed in a negative Y direction; in the case of single scratch of the same residual imprint, performing step D21; and in the case of multiple scratches of the same residual imprint, performing step D22;

D21. for the single scratch of the same residual imprint, driving the test piece to rotate every one revolution by the air-bearing turntable, a component $f_z$ of the step length of the stepping feed of the scratch tool in the Z direction is no less than a minimum cutting depth $d_{min}$ required for the scratch test and no more than a maximum cutting depth $d_{max}$ required for the scratch test, i.e., $d_{min} \leq f_z \leq d_{max}$; and a component $f_y$ of the step length of the stepping feed of the scratch tool in a radial direction (i.e. the Y direction) of the end surface of the air-bearing turntable is no less than 10 μm, so that scratches distributed in the Y direction with gradually changed cutting depths are independent of each other and do not interfere with each other;

performing step D3;

D22. for the multiple scratches of the same residual imprint, after one step is completed in the stepping feed motion of the scratch tool, staying for a residence time t, until a quantity s of scratches required for the test is reached, and continuing to feed to the test piece step by step, wherein the residence time t satisfies $s/n \leq t < (s+1)/n$; a component $f_z$ of the step length of the stepping feed of the scratch tool in the Z direction is no less than a minimum cutting depth $d_{min}$ required for the scratch test and no more than a maximum cutting depth $d_{max}$ required for the scratch test, i.e., $d_{min} \leq f_z \leq d_{max}$; and a component $f_y$ of the step length of the stepping feed of the scratch tool in a radial direction (i.e. the Y direction) of the end face of the air-bearing turntable is no less than 10 μm, so that scratches distributed in the Y direction with gradually changed cutting depths are independent of each other and do not interfere with each other;

D3. when a cumulative displacement of the stepping feed in the Z direction exceeds the maximum cutting depth required for the test, or the nano positioning stage moves to a negative limit position in the Y direction, or the cumulative displacement of the stepping feed in the Z direction reaches a negative limit position in Z direction of the nano positioning stage, stopping the stepping feed, and performing step D31; otherwise, performing step D2;

D31. analyzing the force signals collected by the force sensor during feed, when the scratch force signals are detected, indicating the high-speed scratch conducted by the scratch tool on the surface of the micro convex structure of the test piece, and performing step D5; otherwise, performing step D32;

D32. when the nano positioning stage has reached the negative limit position in the Y direction, controlling the nano positioning stage to move to a positive limit position in the Y direction, and performing step D2; otherwise, performing step D33;

D33. when the nano positioning stage has reached the negative limit position in the Z direction, performing step D4; otherwise, performing step D2;

D4. unlocking the locking mechanism of the Z-direction feeding device, and controlling the scratch tool to feed to the surface of the test piece through the Z-direction feeding device, so that the scratch tool further approaches the surface of the test piece; in order to avoid the scratch tool coming into contact with the micro convex structure in the approaching process, a feeding amount of the Z-direction feeding device does not exceed a difference value between a stroke of the nano positioning stage in the Z direction and a positioning precision of the Z-direction feeding device, and controlling the nano positioning stage to move to the positive limit position in the Z direction; and performing step D1; and D5. unlocking the locking mechanism of the Z-direction feeding device , controlling the scratch tool to lift up through the Z-direction feeding device, stopping the air-bearing turntable, and completing the scratch test.

10. The test method according to claim 9, wherein, when a thickness of the test piece of axisymmetric shape in step A2 is less than 1 mm, an elastic having a length no less than 5 mm, a width no less than 1 mm, and a height no less than 10 μm is pasted on a back of the test piece, a magnetic chuck or a vacuum chuck with a flat surface is used for clamping, in the clamping process, the flat surface of the vacuum chuck/magnetic chuck and the elastic film are used to elastically deform the surface of the test piece through vacuum adsorption/magnetic adsorption to form the micro convex structure.

* * * * *